United States Patent [19]

Harris

[11] Patent Number: 5,153,770
[45] Date of Patent: Oct. 6, 1992

[54] TOTAL INTERNAL REFLECTION ELECTRO-OPTIC MODULATOR

[75] Inventor: Ellis D. Harris, Claremont, Calif.

[73] Assignee: Xerox Corporation, Stamford, Conn.

[21] Appl. No.: 724,566

[22] Filed: Jun. 27, 1991

[51] Int. Cl.$^5$ .................. G02F 1/03; G02F 1/01; G02F 1/29; G02F 1/035

[52] U.S. Cl. .................... 359/245; 359/254; 359/261; 359/263; 359/276; 359/279; 359/318; 385/2

[58] Field of Search .............. 359/245, 254, 263, 276, 359/279, 315, 317, 318, 261; 385/2, 3, 10

[56] References Cited

U.S. PATENT DOCUMENTS

| | | | |
|---|---|---|---|
| 3,813,142 | 5/1974 | Buhrer | 359/279 |
| 3,887,885 | 6/1975 | Hattori et al. | 359/263 |
| 3,958,862 | 5/1976 | Scibor-Rylski | 359/317 |
| 4,125,318 | 11/1978 | Scibor-Rylski | 359/317 |
| 4,196,977 | 4/1980 | Scibor-Rylski | 359/263 |
| 4,281,904 | 8/1981 | Sprague et al. | 359/263 |
| 4,391,490 | 7/1983 | Hartke | 359/245 |
| 4,396,252 | 8/1983 | Turner | 359/285 |
| 4,482,215 | 11/1984 | Sprague et al. | 359/279 |
| 4,636,039 | 1/1987 | Turner | 359/245 |

FOREIGN PATENT DOCUMENTS 0248921 10/1990 Japan .................. 359/279

Primary Examiner—Eugene R. LaRoche
Assistant Examiner—Evelyn A. Lester
Attorney, Agent, or Firm—William Propp

[57] ABSTRACT

The TIR modulator has an electrode array distributed across an area of the reflecting surface of the electro-optic material. The electrode array has interdigitated electrodes extending inward from a rectangular-shaped outer electrode conducting block and outward from a diamond-shaped inner electrode conducting block. A diamond-shaped area with no electrodes is preferably symmetrically within the inner electrode conducting block of the electrode array on the reflecting surface. The uniform voltage difference between the electrodes and the varying lengths of the electrodes creates a fringe electrical field in the electro-optical material and an optical phase grating to diffract the incident light on the reflecting surface. The zero order nondiffracted light becomes the output beam. The optical phase grating will control the incident beam's optical profile at the modulator (near field) and hence the imaged spot size at a focus at the image plane (far field).

Alternatively, the TIR modulator can have a diamond-shaped interdigitated electrode pattern within a rectangular shaped area with no electrodes. Using Schlieren optics, the non-zero order diffracted beam becomes the output beam with a modulated optical beam profile.

Alternatively, the TIR modulator can have uniform lengths to a rectangular interdigitated electrode pattern but varying voltage differences between electrodes.

7 Claims, 3 Drawing Sheets

TOTAL INTERNAL REFLECTION ELECTRO-OPTIC MODULATOR

BACKGROUND OF THE INVENTION

This invention relates to a total internal reflection (TIR) electro-optic modulator, and, more particularly, to a TIR modulator for optical beam profile modulation.

Electro-optical devices have progressed in the art to provide a myriad of structures that operate on an electro-optic effect in a crystalline waveguide medium. Voltages are applied to an electrode array on the surface of the medium. These applied voltages cause the formation of a phase pattern in the medium which deflects and/or focuses the light wave propagating through the medium. This phenomenon occurs because an electric field, established in the medium by the voltages applied to the electrodes, varies the index of refraction of the medium sufficiently to change the relative phase of portions of the light wavefront as it propagates through the medium.

One type of electro-optic medium is the bulk electro-optic modulating device wherein the light wave is confined to a bulk crystal of electro-optic material with an applied electrode array, as illustrated in U.S. Pat. Nos. 3,517,200 and 3,787,111. The electric fields required to generate a periodic index of refraction variation may be applied by electrodes disposed on opposite major surfaces of the electro-optic medium to produce these fields transversely across the medium, as illustrated in the afore-mentioned patents. The electric fields may also be applied from electrodes disposed on one major surface of the electro-optical medium by employing two sets of interleaved electrodes, also referred to as interdigitated electrodes, that produce fringe electric fields into a major surface of the medium.

In either case, the electric fields established in the medium are employed to produce an electro-optic effect to shape the phase front of the oncoming light wave propagating through the medium.

Recently, total internal reflection (TIR) electro-optic modulating devices have come into prominence and attention. In these devices, a set of interdigitated electrodes are employed on a major surface of the electro-optic medium to induce fringe electric fields into the electro-optic medium. Incident light is totally internally reflected from the major surface achieving interaction with fringe electric fields as it passes near the surface of the material at close to grazing incidence. Examples of TIR modulators are disclosed in U.S. Pat. Nos. 3,958,862 and 4,125,318, these patents being assigned to the assignee herein.

More recently, it has been suggested to individually address an alternate set of electrodes in the total internal reflection electro-optic modulators. Voltages are applied to one set of interdigitated electrodes while the other set of interdigitated electrodes remain at a reference voltage level, such as ground, to produce a phase modulation of the light beam at the location of each addressed electrode. By applying a voltage difference to a pair of electrodes, the local magnitude of the electrical fringe field between them can be controlled and varied to permit deflection of the light to a predetermined point at an image plane. An example of TIR modulators with individually addressable electrodes is disclosed in U.S. Pat. No. 4,281,904, this patent being assigned to the assignee herein.

TIR electro-optic modulators are used for wavelength separation of the incident light beam (U.S. Pat. No. 4,125,318), to form a diffraction pattern of a incoherent, unpolarized, nonconvergent, incident light beam (U.S. Pat. No. 3,958,862), as an electro-optic scanning device for deflection of a light beam across an image plane (U.S. Pat. No. 4,386,827, this patent being assigned to the assignee herein) or to convert an electronic signal pattern into a corresponding light intensity profile (U.S. Pat. No. 4,281,904).

It is known that changing an aperture size will change the profile of an incident light beam. Thus, tilting an aperture is a mechanical means of modulating a beam profile, and hence spot size of a light beam at an image plane. Typically, a sliding or rotating variable neutral density wedge is used to modulate the optical beam profile.

However, nonmechanical means, preferably electronic means, are needed to modulate an optical beam profile within an electronic optical device. The availability of electronic means to modify an optical beam will greatly increase the speed of response and thus the information bandwidth of the modulation channel. Electronic means of optical beam profile modulation will enable the potential of real time beam profile variation by computer control.

It is an object of this invention to provide a novel TIR electro-optic modulator to modulate an optical beam profile.

It is another object of this invention to provide a TIR modulator wherein the electrodes in the electrode array are not individually addressable but the voltage for each set of electrodes is nonetheless varied.

SUMMARY OF THE INVENTION

In accordance with the present invention, the TIR modulator has an electrode array distributed across an area of the reflecting surface of the electro-optic material. The electrode array has interdigitated electrodes extending inward from a rectangular-shaped outer electrode conducting block and outward from a diamond-shaped inner electrode conducting block. A diamond-shaped area with no electrodes is preferably symmetrically within the inner electrode conducting block of the electrode array on the reflecting surface. The uniform voltage difference between the electrodes and the varying lengths of the electrodes creates a fringe electrical field in the electro-optical material and an optical phase grating to diffract the incident light on the reflecting surface. The zero order nondiffracted light becomes the output beam. The optical phase grating will control the incident beam's optical profile at the modulator (near field) and hence the imaged spot size at a focus at the image plane (far field).

Alternatively, the TIR modulator can have a diamond-shaped interdigitated electrode pattern within a rectangular shaped area with no electrodes. Using Schlieren optics, the non-zero order diffracted beam becomes the output beam with a modulated optical beam profile.

Alternatively, the TIR modulator can have uniform lengths to a rectangular interdigitated electrode pattern but varying voltage differences between electrodes.

Other objects and attainments together with a fuller understanding of the invention will become apparent and appreciated by referring to the following descrip-

DETAILED DESCRIPTION OF THE INVENTION

Figure 1:
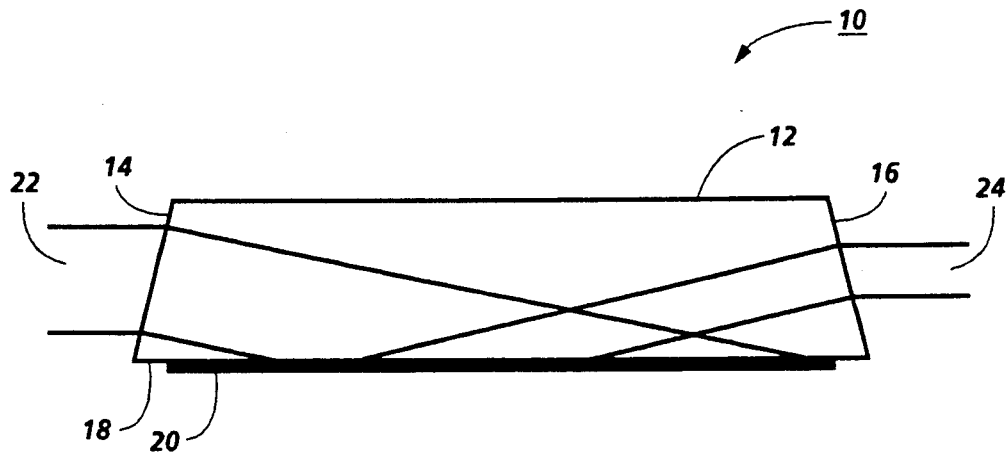
FIG. 1 is a schematic illustration of the side view of the total internal reflection (TIR) modulator formed according to the present invention.

Reference is now made to FIG. 1 wherein there is disclosed a total internal reflection (TIR) modulator 10 consisting of electro-optic material formed of a $LiNbO_3$ x-y cut crystal 12. The crystal has three polished surfaces, an input face 14, an opposing output face 16, and an intermediate or longitudinal reflecting surface 18 between the input and output faces. An electrode array 20 is distributed across an area of the reflecting surface 18. In a preferred embodiment, the electrode array 20 would comprise essentially the full width and length of the reflecting surface 18. This electrode array is deposited upon or is proximate to the electro-optic medium such as to induce fringe electric fields into the electro-optic medium 12. It will be appreciated that shapes for the modulator crystal other than one shown are possible to achieve the required reflection. In the form shown, a crystal with overall dimensions of about $4 \times 4 \times 15$ millimeters provides satisfactory operation.

An incident beam 22 of collimated light of a single wavelength, parallel to the plane of the reflecting surface 18 and electrode array 20, is refracted at the angled surface of the input end face 14 at a grazing angle of incidence onto the reflecting surface 18 on which the electrode array 20 is proximately coupled. The incident beam is totally internally reflected from the surface 18 and modulated by any fringing electric field from the electrode array 20 extending into the electro-optic crystal 12 to provide an output beam 24 which exits from the electro-optic element 10 through its angled output face 16. The output beam 24 is refracted at the output face 16 co-linear with the incident beam 22, that is parallel to the plane of the reflecting surface 18 and electrode array 20.

It is convenient, but not essential, that the end surfaces of the input face 14 and output face 16 are cut at a bevel so as to refract incident beam 22 and outgoing beam 24 into a grazing angle of incidence at reflecting surface 18. The end surfaces can also be cut at the Brewster angle for the light beam, such that reflection losses at the input and output faces are minimized. Instead of an incident monochromatic beam, polychromatic light may also be used. And, although a collimated beam of light is the preferred method, other conditions of beam convergence or divergence for the incident beam may be used.

Figure 2:
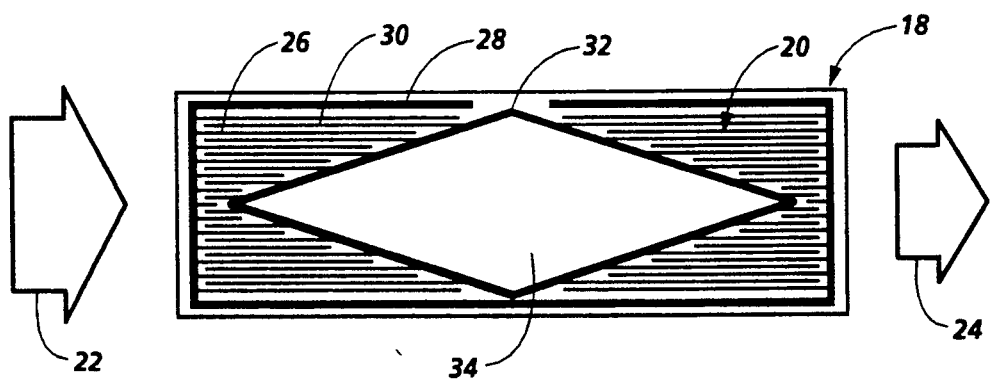
FIG. 2 is a schematic illustration of the electrode array of the total internal reflection (TIR) modulator of FIG. 1 formed according to the present invention.

The electrode array 20 is vacuum deposited on the reflecting surface 18 in an interdigitated pattern as shown in FIG. 2 through photoresist masking or etching methods that are known to those of ordinary skill in the art. The electrodes are typically 5 microns wide with a pitch (or distance between the centers of adjacent individual interdigitated electrodes) of 10 microns. The electrodes are, preferably, vacuum deposited copper on chromium which offers good adhesion properties to the reflecting surface. Typical thicknesses are 1 and 10 microns for chromium and copper respectively.

The electrode array 20 is symmetrically patterned on the reflecting surface 18 with one set of interdigitated electrodes 26 extending inward from a rectangular-shaped outer electrode conducting block 28 and the alternate set of interdigitated electrodes 30 extending outward from a diamond-shaped inner electrode conducting block 32. The diamond-shaped area 34 with no electrodes is preferably symmetrically within the inner electrode conducting block 32 of the electrode array on the reflecting surface. An alternate description of the electrode array 20 is an inverse, or antipodal, diamond-shaped interdigitated electrode pattern within a rectangle surrounding a diamond-shaped non-electroded area 34 on the reflecting surface.

The lengths of the interdigitated electrodes 26 and 30 of the electrode array 20 extend in the longitudinal direction of the reflecting surface 18, and the incident beam 22 and output beam 24 propagate generally in that longitudinal direction. The inverse diamond electrode pattern within a rectangular outer edge provides for uniformly increasing or decreasing electrode lengths in the electrode array.

Voltages are applied to one set of the interdigitated electrodes through its conducting block while the other set of interdigitated electrodes through its conducting block remains at a reference voltage level, such as ground. Alternatively, the two electrode sets could be driven by a push-pull arrangement with each set of interdigitated electrodes having opposite polarity to the other. These applied voltages create localized fringe electric fields between adjacent interdigitated electrodes. The electric fields extend for a short distance equal to approximately one-half the electrode pitch into the electro-optic crystal from the reflecting surface.

Because the interdigitated electrode pattern is periodic and because the localized fringe electric fields produce transverse localized variations in the refractive index within the electro-optic crystal, an optical phase grating is established within the electro-optic crystal proximate to the adjacent interdigitated electrode pairs.

Since the incident light to the modulator is totally internally reflected at the reflecting surface where the optical phase grating has been produced by the electrode array, the phase front of the light is diffracted as it propagates through the electro-optic medium. This diffraction causes the light beam to be spatially phase front modulated as it propagates through the electro-optic medium in accordance with the electrode pattern of the array on the reflecting surface.

With both sets of interdigitated electrodes set at zero voltage or ground, the electrode array 20 does not produce an optical phase grating in the electro-optic medium and the reflecting surface functions as a purely totally internally reflecting surface. The incident beam 22 is neither diffracted nor modulated but merely reflected by the electrode array and the output beam 24 emerges from the electro-optic crystal 12 unchanged from the incident beam 22.

The inverse diamond electrode pattern within a rectangular outer edge provides for uniformly increasing or decreasing electrode lengths in the electrode array. With a voltage difference applied between the conducting blocks, the various lengths of the individual electrodes along the longitudinal axis of the reflecting surface determine the length of interaction of the beam with the induced phase grating in the electro-optic medium. These voltages produce a pattern of optical phase gratings within the crystal which diffract the incident light according to the induced pattern. The magnitude of the diffraction of any portion of the beam is determined by both the applied voltage and the length of the interaction as determined by the pair of interdigitated electrodes which form the specific optical phase grating modulating that portion of the beam.

The magnitude and pattern of the applied voltage and the resulting induced electric field within the electro-optic crystal determines the resulting optical phase grating within the TIR modulator. An electric field of either polarity will produce the effect. Alternating positive and negative polarity for the non reference set of interdigitated electrodes will prevent charge trapping within the crystal lattice but is not essential to the operation of the invention.

In the electroded area of the electrode array 20, the incident beam flux is diffracted into a series of orders whose intensities vary with electrode voltage. At zero voltage, no light is diffracted and all the optical flux remains in the zero order beam. As a voltage difference is applied to the interdigitated electrodes, the combination of the electrode array and electro-optical crystal forms an induced phase grating which diffracts the incident beam throwing optical flux into the higher diffraction orders. The intensity of the zero order portion of the beam is thus reduced. At some maximum applied voltage difference, the zero order of the diffracted output beam for a local region of the electrode array will be effectively extinguished, the energy having been transferred to other higher diffraction orders.

The non-electroded area 34 within the electrode array 20 continues to function as a purely totally internally reflecting surface even when voltage is applied to the interdigitated electrodes surrounding the non-electrode area. This non-electrode area does not diffract nor modulate the incident beam but merely reflects the light incident upon the area at the total internal reflection surface as a zero order output beam.

As best seen in FIG. 2, the electrode array for any portion of the incident beam consists physically of both a first pair of interdigitated electrodes of a determined length, a non-electroded area, and a second pair of interdigitated electrodes of the same length as the first pair. Optically, the electrode array consists optically of a first optical phase grating, a totally internally reflecting surface, and a second optical phase grating, equal to the first. The longer the lengths of the interdigitated electrodes, the shorter the length of the nonelectroded area with the result of the greater the optical phase grating to diffract the incident light and the lesser the reflecting surface to reflect the incident light.

The voltage difference between the outer electrode conducting block 28 and the inner electrode conducting block 32 is uniform. Therefore the voltage difference between the interdigitated electrodes 26 and 30 is also uniform, even though the electrodes have varying lengths. The optical phase grating created by this uniform voltage difference and varying lengths attenuates the incident light into higher diffraction orders.

The magnitude of the diffraction is determined by both the applied voltage and the electrode length in the region of electro-optical interaction, the localized fringe electric field of the optical phase grating. When no voltage is applied, there is no diffraction. When a maximum voltage is applied, optical flux in regions where there are electrodes can be largely removed from the beam, leaving the beam cross-section essentially as determined by the non electrode area. At intermediate voltages, the beam cross-section will lie between these two extremes. The voltage applied to such an electrode array of the TIR modulator will thus control the beam profile and hence the imaged spot size at a focus at the image plane.

As shown in FIG. 1, no Schlieren or other optics are needed to convert the spatial phase front modulation of the output beam 24 into a correspondingly modulated intensity profile.

The voltage applied to the total internal reflection (TIR) modulator 10 will thus control the local beam profile at the device (near field) and hence the imaged spot size at a focus at the image plane (far field). Other shapes, such as elliptical or oval, for example, can be used for the non-electrode area with the surrounding electrode array being the inverse or antipodal shape.

Figure 3:
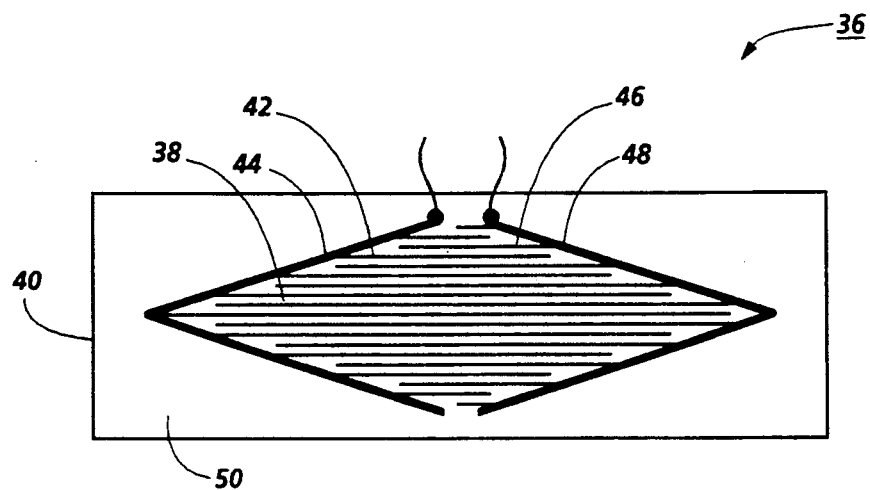
FIG. 3 is a schematic illustration of an alternate embodiment of the electrode array of a total internal reflection (TIR) modulator formed according to the present invention.

The total internal reflection (TIR) modulator 36 of FIG. 3 is identical in structure to that of the TIR modulator 10 of FIG. 1, except the electrode array 38 on the reflecting surface 40 is diamond-shaped and the remainder of the rectangular-shaped reflecting surface has no electrodes. The diffracted optical flux is used as the principal output beam by a Schlieren optical system.

The electrode array 38 is symmetrically patterned on the reflecting surface 40 with one set of interdigitated electrodes 42 extending inward from a V-shaped outer electrode conducting block 44 and the alternate set of interdigitated electrodes 46 extending inward from a V-shaped outer electrode conducting block 48, complementary to the conducting block 44. The complementary V-shaped conducting blocks 44 and 48 form the diamond shape of the electrode array 38. The rectangular area 50 with no electrodes preferably symmetrically surrounds the diamond shaped electrode array 38. An alternate description of the non-electroded area 50 is an inverse, or antipodal, diamond-shaped non-electroded area pattern within a rectangle surrounding a diamond-shaped electrode array 38 on the reflecting surface 40.

The lengths of the interdigitated electrodes 42 and 46 of the electrode array 38 extend in the longitudinal direction of the reflecting surface 40, and the incident beam and output beam (both not shown) propagate generally in that longitudinal direction. The diamond electrode pattern provides for uniformly increasing or decreasing electrode lengths in the electrode array 38.

Similar to the TIR modulator 10 of FIG. 1, voltages are applied to one set of the interdigitated electrodes through its conducting block while the other set of interdigitated electrodes through its conducting block remains at a reference voltage level, such as ground. These applied voltages create localized fringe electric fields between adjacent interdigitated electrodes.

Because the interdigitated electrode pattern is periodic and because the localized fringe electric fields produce transverse localized variations in the refractive index within the electro-optic crystal, an optical phase grating is established within the electro-optic crystal proximate to the adjacent interdigitated electrode pairs.

Since the incident light to the modulator is totally internally reflected at the reflecting surface where the optical phase grating has been produced by the electrode array, the phase front of the light is diffracted as it propagates through the electro-optic medium. The output beam is diffracted into a series of orders whose intensities vary with electrode voltage. This diffraction causes the light beam to be spatially phase front modulated as it propagates through the electro-optic medium in accordance with the electrode pattern of the array on the reflecting surface.

Unlike the TIR modulator 10 of FIG. 1 where the zero order, nondiffracted component of the output beam is used to obtain the image of the beam profile at the image plane, the nonzero, higher order diffraction components of the output beam are used to obtain the image of the beam profile at the image plane.

Schlieren dark field imaging optics are employed to convert the spatial phase front modulation of the output beam from the TIR modulator 36 into a correspondingly modulated intensity profile and to provide any magnification necessary to obtain an image of the desired size on the image plane, as is known to those of ordinary skill in the art.

Figure 4:
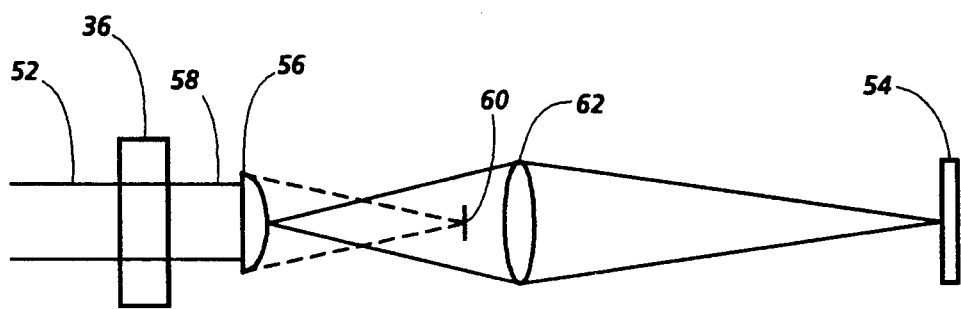
FIG. 4 is a schematic illustration of the side view of the total internal reflection (TIR) modulator of FIG. 1 and Schlieren dark field imaging optics formed according to the present invention.

An incident beam 52 is reflected and diffracted by the TIR modulator 36 in FIG. 4. The Schlieren central dark field imaging optics are optically aligned between the TIR modulator 36 and the image plane 54. The imaging optics typically include a field lens 56 for focusing the diffracted output beam 58 of the TIR modulator onto the central stop 60. The field lens is optically aligned between the TIR modulator and the stop so that substantially all of the zero order diffraction components of the output beam are focussed on the stop. However, the higher order diffraction components of the output beam scatter around the stop and are collected by the imaging lens 62 which, in turn, causes them to focuses onto the image plane 54, thereby providing an intensity modulated image by the TIR modulator.

At zero voltage applied to the electrode array 38 of the TIR modulator 36, there is no phase grating formed at the reflecting surface, so there is no diffraction. The reflecting surface 38 functions as a purely totally reflecting surface. The incident beam remains a zero order, non-diffracted beam and the output beam emerges from the TIR modulator 38 unchanged from the incident beam. The output beam is focussed by the field lens 56 onto the stop 60. None of the beam is therefore imaged onto the image plane 54.

As intermediate voltages are applied to the electrode array, the interdigitated electrodes form optical phase gratings such that the incident beam is diffracted at the diamond shaped electroded areas of the reflecting surface into zero and higher order components of a diffracted output beam. The zero order components of the diffracted beam and the components of the beam reflected at the surface in the non-electrode area are blocked by the stop while the higher order diffraction components of the output beam are collected by the imaging lens to be reimaged on the image plane. The beam cross-section essentially is determined by portions of the beam diffracted by the electrode array.

When a maximum voltage is applied to the electrode array, the optical phase grating formed by the interdigitated electrodes diffract the incident light almost totally into nonzero, higher order components of a diffracted output beam. The zero order components of the beam reflected at the surface in the non-electrode area are blocked by the stop while the higher order diffraction components of the output beam are collected by the imaging lens to be reimaged on the image plane. The beam cross-section essentially is determined by the diamond shaped electrode array.

As in the TIR modulator 10 of FIG. 1, the voltage difference between the complementary V-shaped conducting blocks 44 and 48 of the TIR modulator 36 of FIG. 3 is uniform. Therefore the voltage difference between the interdigitated electrodes 42 and 46 is also uniform, even though the electrodes have varying lengths. The optical phase grating created by this uniform voltage difference and varying lengths attenuates the incident light into higher diffraction orders where the Schlieren optics system converts the spatial phase front modulation of the output beam into a correspondingly modulated intensity profile.

The voltage applied to the total internal reflection (TIR) modulator 36 will thus control the imaged spot size at a focus at the image plane (far field). Other shapes, such as elliptical or oval, for example, can be used for the electroded array with the surrounding non-electrode area being the inverse or antipodal shape.

Figure 5:
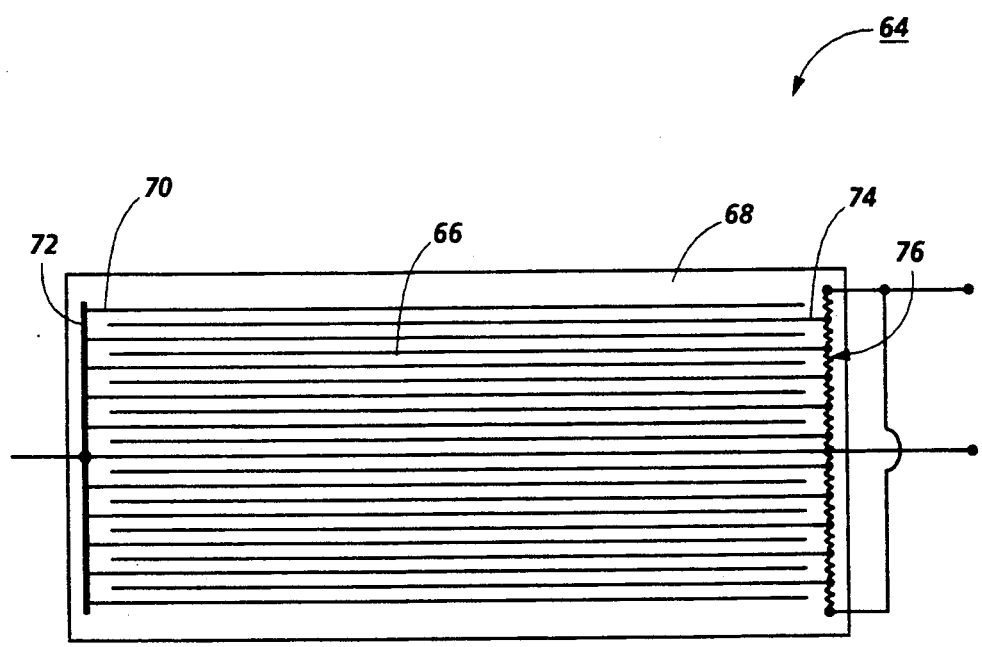
FIG. 5 is a schematic illustration of another alternate embodiment of the electrode array of a total internal reflection (TIR) modulator formed according to the present invention.

The TIR modulator of FIG. 5 uses the same principle as the previous embodiments but a different approach. The previous embodiments of the TIR modulators applied a uniform voltage to a variable length electrode array. The TIR modulator embodiment of FIG. 5 applies a variable voltage to a uniform length electrode array.

The total internal reflection (TIR) modulator 64 of FIG. 5 is identical in structure to that of the TIR modulator 10 of FIG. 1, except the electrode array 66 on the reflecting surface 68 is rectangular in shape filling essentially the entire reflecting surface, there being no non-electrode area.

The electrode array 66 is symmetrically patterned on the reflecting surface 68 with one set of interdigitated electrodes 70 extending inward from a linear outer reference electrode conducting block 72, with the conducting block 72 extending across the width of the reflecting surface 68. The alternate set of interdigitated electrodes 74 extend inward from a linear outer electrode resistive block 76, also extending across the width of the reflecting surface 68 and complementary to the conducting block 72. The complementary linear conducting block 72 and resistive block 76, along with the outermost electrodes along the edge of the reflecting surface form the rectangular shape of the electrode array 66.

The lengths of the interdigitated electrodes 70 and 74 of the electrode array 66 extend in the longitudinal direction of the reflecting surface 68, and the incident beam and output beam (both not shown) propagate generally in that longitudinal direction.

Voltages are applied to one set of the interdigitated electrodes through the resistive block while the other set of interdigitated electrodes through the conducting block remains at a reference voltage level, such as ground.

The resistivity of the resistive block is preferably uniform from both the outer edges of the resistive block to the center of the resistive block. However, the resistivity may be nonlinear to achieve a desired optical beam profile.

Voltage is applied to the outer edges of the resistive block while the center of the resistive block remains at the reference voltage level, being connected to the reference electrode set. The voltage between electrodes will follow the resistivity of the resistive block such that the voltage between electrodes will decrease from its maximum near the outer edge of the resistive block to its minimum, or zero, at the center of the resistive block.

If the resistance along the resistive block is linear, then the resistivity of the resistive block will increase uniformly from the edge to the center of the resistive block. Therefore, the voltage difference decreases uniformly for the electrode pairs from the edge to the center of the electrode array, and then increases uniformly from the center back to the other edge of the electrode array.

As has been described previously, higher voltage between adjacent interdigitated electrode pairs causes greater diffraction into higher, nonzero, orders. Thus, diffraction of the incident beam reflecting off the reflecting surface 68 of the TIR modulator 64 is maximum at the longitudinal edges of the electrode array and uniformly decreases to a minimum, or zero, at the longitudinal center of the array.

At zero voltage applied to the resistive block 76 of the electrode array 66 of the TIR modulator 64, there is no phase grating formed at the reflecting surface, so there is no diffraction. The reflecting surface 68 functions as a purely totally reflecting surface. The incident beam remains a zero order, non-diffracted beam and the output beam emerges from the TIR modulator unchanged from the incident beam.

As intermediate or maximum voltages are applied to the resistive block 76 of the electrode array 66, the interdigitated electrodes form optical phase gratings within the electro-optical crystal such that the incident beam is diffracted. The incident beam is diffracted the maximum into higher, nonzero orders at electrode pairs of minimum resistance and maximum voltage difference, those near the edges of the electrode array. The incident beam is diffracted the minimum at electrode pairs of maximum resistance and minimum voltage difference, those near the center of the electrode array. Even at maximum voltage difference, the resistance near the edges of the resistive block will cause the electrode pairs near the edges of the electrode array not to totally diffract the incident beam into exclusively higher, nonzero orders. There will be both zero and higher order components to the diffracted output beam.

The electrode array 66 of the TIR modulator 64 of FIG. 5 is the functional equivalent of the electrode array 20 of TIR modulator 10 of FIG. 1. No Schlieren or other optics are needed to convert the spatial phase front modulation of the output beam into a correspondingly modulated intensity profile. The voltage applied to the total internal reflection (TIR) modulator 64 will thus control the local beam profile at the device (near field) and hence the imaged spot size at a focus at the image plane (far field).

Alternatively, the voltage could be applied to the center of the resistive block, with the resistivity of the resistive block increasing uniformly from the center to the edges of the resistive block. The edges of the resistive block could be set at a reference voltage level, such as ground. The resulting electrode array of the resulting TIR modulator would be the functional equivalent of the electrode array 38 of the TIR modulator 36 of FIG. 3. Schlieren central dark field imaging optics, as previously discussed and shown in FIG. 4 would be used with the TIR modulator to convert the spatial phase front modulation of the output beam into a corresponding modulated intensity profile and provide any magnification that is required to form an image of the desired size on the image plane.

Alternatively, the input face and the output face of the various TIR modulators herein described can be parallel to each other and perpendicular to the reflecting surface. As is known in the art, the input beam is transmitted through the input face of the electro-optic crystal at a grazing angle of incidence relative to the reflecting surface (i.e., an angle no greater than the critical angle of incidence for total internal reflectance from the surface) and is brought to a wedge-shaped focus on that surface approximately midway through the electro-optic crystal. Consequently, the input beam is totally internally reflected from the reflecting surface to provide an output beam which exits from the electro-optic crystal through its output face.

The electrode array and the electro-optic crystal of the various embodiments of the TIR modulators may be physically distinct components which are pressed or otherwise firmly held together to achieve "proximately coupling," as is known to those of ordinary skill in the art.

The electrical interface can be significantly simplified if the electrodes of the array are fabricated on a separate substrate, such as a silicon integrated circuit, and pressed or otherwise held closely adjacent to the electro-optic crystal to "proximately couple" electric fields into the electro-optic crystal.

The couple these fields into the electro-optic crystal, the electrodes of the array are supported on or very near the reflecting surface of the electro-optic crystal. For example, the electrodes can be defined by suitably patterning an electrically conductive, metallization layer, which is deposited on and incorporated in of a LSI or a VLSI silicon integrated circuit.

Furthermore, the silicon circuit is pressed or otherwise firmly held against the electro-optic element to maintain the electrodes in contact with or closely adjacent to the reflecting surface of the electro-optic crystal. The advantage of this construction is that the silicon circuit may be used to make the necessary electrical connections to the electrodes for the addressing and driving electronics of the electrode array, thereby simplifying the electrical interface of the TIR modulators.

The TIR modulators described are at least substantially insensitive to temperature variation because a phase-modulated technique is used which is virtually independent of temperature if temperature-independent electro-optic coefficients are used, for example, $r_{22}$ in $LiNbO_3$. Suitable electro-optic materials besides $LiNbO_3$ include $LiTaO_3$, BSN, ADP, KDP, KDxP, KDA, PLZT and $Ba_2NaNb_5O_{15}$.

While the invention has been described in conjunction with specific embodiments, it is evident that many alternatives, modifications and variations will be apparent to those skilled in the art in light of the foregoing description. Accordingly, the invention is intended to embrace all such alternatives, modifications and variations as fall within the spirit and scope of the appended claims.

What is claimed is:

1. A total internal reflection electro-optical modulator comprising:

an electro-optical material having first, second and third surfaces, an electrode pattern array proximate to said first surface of said electro-optical material, said electrode pattern array comprising first and second sets of interdigitated electrodes of varying lengths, each of the electrodes of said first set being addressable at a uniform voltage level, said second set of electrodes being set at a reference voltage level, the voltage levels applied to said first set of electrodes inducing a localized electric field adjacent said first surface of said electro-optical material, and a coherent light beam parallel to said first surface is deflected at said second and third surfaces to suffer total internal reflection at said first surface, the lengths of said electrodes in said electrode pattern array extending in the general direction of travel of said coherent light beam, and said localized electric field producing a spatial modulation of said coherent light beam's optical profile corresponding to the location of each electrode, the local magnitude of which is related to the length of said electrode.

2. The total internal reflection electro-optical modulator of claim 1 wherein said first surface comprises said electrode pattern array and a non-electrode area.

3. The total internal reflection electro-optical modulator of claim 2 wherein said coherent light beam's optical profile corresponds to the profile of said non-electrode area.

4. The total internal reflection electro-optical modulator of claim 3 wherein said electrode pattern array is antipodal diamond-shaped within a rectangle and said non-electrode area is diamond-shaped.

5. The total internal reflection electro-optical modulator of claim 2 wherein said coherent light beam's optical profile corresponds to the profile of said electrode pattern array.

6. The total internal reflection electro-optical modulator of claim 5 wherein said electrode pattern array is diamond-shaped and said non-electrode area is antipodal diamond-shaped within a rectangle.

7. The total internal reflection electro-optical modulator of claim 1 further comprising a separate substrate for supporting said electrode pattern array, and means for proximately coupling said substrate against said electro-optical material whereby said electrode pattern array is proximate to said first surface of said electro-optical material.

* * * * *